(12) United States Patent
Toosi et al.

(10) Patent No.: US 8,616,693 B1
(45) Date of Patent: Dec. 31, 2013

(54) PHASE CHANGE INK COMPRISING COLORANTS DERIVED FROM PLANTS AND INSECTS

(71) Applicants: Xerox Corporation, Norwalk, CT (US); David J. Arthur, Rochester, NY (US)

(72) Inventors: Salma Falah Toosi, Mississauga (CA); Mihaela Maria Birau, Mississauga (CA); C. Geoffrey Allen, Waterdown (CA); Biby Esther Abraham, Mississauga (CA); Peter G. Odell, Mississauga (CA); Caroline Turek, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/690,941

(22) Filed: Nov. 30, 2012

(51) Int. Cl.
*G01D 11/00* (2006.01)

(52) U.S. Cl.
USPC .............................. 347/99; 347/100

(58) Field of Classification Search
USPC ................. 347/15, 21, 43, 95–100
See application file for complete search history.

(56) References Cited

U.S. PATENT DOCUMENTS

| | | | |
|---|---|---|---|
| 3,653,932 A | 4/1972 | Berry et al. |
| 4,251,824 A | 2/1981 | Hara et al. |
| 4,390,369 A | 6/1983 | Merritt et al. |
| 4,410,899 A | 10/1983 | Haruta et al. |
| 4,412,224 A | 10/1983 | Sugitani |
| 4,484,948 A | 11/1984 | Merritt et al. |
| 4,490,731 A | 12/1984 | Vaught |
| 4,532,530 A | 7/1985 | Hawkins |
| 4,601,777 A | 7/1986 | Hawkins et al. |
| 4,684,956 A | 8/1987 | Ball |
| 4,830,671 A | 5/1989 | Frihart et al. |
| 4,851,045 A | 7/1989 | Taniguchi |
| 4,889,560 A | 12/1989 | Jaeger et al. |
| 4,889,761 A | 12/1989 | Titterington et al. |
| 5,006,170 A | 4/1991 | Schwarz et al. |
| 5,151,120 A | 9/1992 | You et al. |
| 5,194,638 A | 3/1993 | Frihart et al. |
| 5,195,430 A | 3/1993 | Rise |
| 5,231,135 A | 7/1993 | Machell et al. |
| 5,372,852 A | 12/1994 | Titterington et al. |
| 5,389,958 A | 2/1995 | Bui et al. |
| 5,496,879 A | 3/1996 | Griebel et al. |
| 5,597,856 A | 1/1997 | Yu et al. |

(Continued)

FOREIGN PATENT DOCUMENTS

| | | |
|---|---|---|
| EP | 0187352 | 7/1986 |
| EP | 206286 | 12/1986 |

(Continued)

OTHER PUBLICATIONS

Mihaela Maria. Birau, et al., U.S. Appl. No. 13/690,857, filed Nov. 30, 2012, "Modified Naturally-Derived Colorants for Phase Change Ink Applications," not yet published, 49 pages, 1 drawing sheet.

(Continued)

*Primary Examiner* — Thinh Nguyen
(74) *Attorney, Agent, or Firm* — Marylou J. Lavoie

(57) ABSTRACT

A phase change ink composition including a wax; an optional dispersant; an optional synergist; and a naturally-derived colorant wherein the naturally-derived colorant is a colorant derived from a plant, a colorant derived from an insect, or a mixture or combination thereof.

20 Claims, 1 Drawing Sheet

(56) References Cited

U.S. PATENT DOCUMENTS

| | | | |
|---|---|---|---|
| 5,750,604 A | 5/1998 | Banning et al. | |
| 5,780,528 A | 7/1998 | Titterington et al. | |
| 5,782,966 A | 7/1998 | Bui et al. | |
| 5,783,658 A | 7/1998 | Banning et al. | |
| 5,827,198 A | 10/1998 | Kassal | |
| 5,830,942 A | 11/1998 | King et al. | |
| 5,919,839 A | 7/1999 | Titterington et al. | |
| 6,099,631 A * | 8/2000 | Tregub et al. | 106/31.85 |
| 6,174,937 B1 | 1/2001 | Banning et al. | |
| 6,255,432 B1 | 7/2001 | Evans et al. | |
| 6,281,172 B1 | 8/2001 | Warren et al. | |
| 6,309,453 B1 | 10/2001 | Banning et al. | |
| 6,472,523 B1 | 10/2002 | Banning et al. | |
| 6,476,219 B1 | 11/2002 | Duff et al. | |
| 6,547,380 B2 | 4/2003 | Smith et al. | |
| 6,576,747 B1 | 6/2003 | Carlini et al. | |
| 6,576,748 B1 | 6/2003 | Carlini et al. | |
| 6,590,082 B1 | 7/2003 | Banning et al. | |
| 6,646,111 B1 | 11/2003 | Carlini et al. | |
| 6,663,703 B1 | 12/2003 | Wu et al. | |
| 6,673,139 B1 | 1/2004 | Wu et al. | |
| 6,696,552 B2 | 2/2004 | Mayo et al. | |
| 6,713,614 B2 | 3/2004 | Carlini et al. | |
| 6,726,755 B2 | 4/2004 | Titterington et al. | |
| 6,755,902 B2 | 6/2004 | Banning et al. | |
| 6,821,327 B2 | 11/2004 | Jaeger et al. | |
| 6,858,070 B1 | 2/2005 | Wong et al. | |
| 6,860,930 B2 | 3/2005 | Wu et al. | |
| 6,893,479 B2 | 5/2005 | Eswaran et al. | |
| 6,906,118 B2 | 6/2005 | Goodbrand et al. | |
| 6,958,406 B2 | 10/2005 | Banning et al. | |
| 7,053,227 B2 | 5/2006 | Jaeger et al. | |
| 7,381,831 B1 | 6/2008 | Banning et al. | |
| 7,407,539 B2 | 8/2008 | Wu et al. | |
| 7,427,323 B1 | 9/2008 | Birau et al. | |
| 7,677,713 B2 * | 3/2010 | Turek et al. | 347/99 |
| 7,973,186 B1 | 7/2011 | Goredema et al. | |
| 8,273,166 B2 | 9/2012 | Birau et al. | |

FOREIGN PATENT DOCUMENTS

| | | |
|---|---|---|
| GB | 2238792 | 6/1991 |
| GB | 2290793 | 1/1996 |
| GB | 2294939 | 5/1996 |
| GB | 2305670 | 4/1997 |
| GB | 2305928 | 4/1997 |
| WO | WO 94/04619 | 3/1994 |
| WO | WO 94/14902 | 7/1994 |
| WO | WO 95/04760 | 2/1995 |
| WO | WO 96/14364 | 5/1995 |
| WO | WO 97/12003 | 4/1997 |
| WO | WO 97/13816 | 4/1997 |
| WO | WO 9733943 | 9/1997 |

OTHER PUBLICATIONS

Salma Falah Toosi, et al., U.S. Appl. No. 13/690,898, filed Nov. 30, 2012, "Phase Change Ink Comprising Modified Naturally-Derived Colorants," not yet published, 85 pages, 6 drawing sheets.

Salma F. Toosi, et al., U.S. Appl. No. 13/611,264, filed Sep. 12, 2012, "Phase Change Ink With Compostable Wax," not yet published, 35 pages.

English abstract for German Patent Publication DE 4205636AL, Aug. 26, 1993, Griebel et al., 1 page.

English abstract for German Patent Publication DE 4205713AL, Aug. 26, 1993, Griebel et al., 1 page.

* cited by examiner

| EXAMPLE | NATURAL PIGMENT AND DISPERSANT | PRINT (200% AND 100% DENSITY) BEFORE LIGHTFASTNESS TEST | PRINT (200% AND 100% DENSITY) AFTER LIGHTFASTNESS TEST |
|---|---|---|---|
| 2A | LAC EXTRACT AND SOLSPERSE® 17000 | | |
| 3A | LAC EXTRACT AND DISPERSANT 1 | | |
| 4A | WOOD EXTRACT AND DISPERSANT 1 | | |
| 5A | WOOD EXTRACT AND SOLSPERSE® 17000 | | |
| 6A | COCHINEAL AND DISPERSANT 2 | | |
| 7 | TUMERIC AND DISPERSANT 1 | | |

PHASE CHANGE INK COMPRISING COLORANTS DERIVED FROM PLANTS AND INSECTS

RELATED APPLICATIONS

Commonly assigned U.S. patent application Ser. No. 13/690,857, entitled "Modified Naturally-Derived Colorants For Phase Change Ink Applications"), filed concurrently herewith, which is hereby incorporated by reference herein in its entirety, describes modified naturally-derived colorants suitable for use in phase change or solid inks.

Commonly assigned U.S. patent application Ser. No. 13/690,898, entitled "Phase Change Inks Containing Modified Naturally-Derived Colorants"), filed concurrently herewith, which is hereby incorporated by reference herein in its entirety, describes phase change inks including modified naturally-derived colorants.

BACKGROUND

Disclosed herein is a phase change ink composition comprising a wax; an optional dispersant; an optional synergist; and a naturally-derived colorant wherein the naturally-derived colorant is a colorant derived from a plant, a colorant derived from an insect, or a mixture or combination thereof.

In general, phase change inks (sometimes referred to as solid inks or "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes.

The colorants can also include pigments, as disclosed in, for example, U.S. Pat. No. 5,221,335, the disclosure of which is totally incorporated herein by reference.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

Ink jetting devices are known in the art, and thus extensive description of such devices is not required herein. As described in U.S. Pat. No. 6,547,380, which is hereby incorporated herein by reference in its entirety, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, which is hereby incorporated herein by reference in its entirety, the image is applied by jetting appropriately colored inks during four to eighteen rotations (incremental movements) of a substrate (an image receiving member or intermediate transfer member) with respect to the ink jetting head, i.e., there is a small translation of the print head with respect to the substrate in between each rotation. This approach simplifies the print head design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Thermal ink jet processes are well known and are described, for example, in U.S. Pat. Nos. 4,601,777, 4,251,824, 4,410,899, 4,412,224 and 4,532,530, the disclosures of each of which are hereby incorporated herein.

As noted, ink jet printing processes may employ inks that are solid at room temperature and liquid at elevated temperatures. For example, U.S. Pat. No. 4,490,731, which is hereby incorporated by reference herein, discloses an apparatus for dispensing solid ink for printing on a substrate such as paper. In thermal ink jet printing processes employing hot melt inks, the solid ink is melted by the heater in the printing apparatus and utilized (i.e., jetted) as a liquid in a manner similar to that of conventional thermal ink jet printing. Upon contact with the printing substrate, the molten ink solidifies rapidly, enabling the colorant to substantially remain on the surface of the substrate instead of being carried into the substrate (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of non-printing without the danger of nozzle clogging, even without capping the nozzles.

Examples of the phase change inks herein are inks that include an ink vehicle that is solid at temperatures of about 23° C. to about 27° C., for example room temperature, and specifically are solid at temperatures below about 60° C. However, the inks change phase upon heating, and are in a molten state at jetting temperatures. Thus, the inks have a viscosity of from about 1 to about 20 centipoise (cp), for example from about 5 to about 15 cp or from about 8 to about 12 cp, at an elevated temperature suitable for ink jet printing, for example temperatures of from about 60° C. to about 150° C.

In this regard, the inks herein may be either low energy inks or high energy inks. Low energy inks are solid at a temperature below about 40° C. and have a viscosity of from about 1 to about 20 centipoise such as from about 5 to about 15 centipoise, for example from about 8 to about 12 cp, at a jetting temperature of from about 60° C. to about 100° C. such as about 80° C. to about 100° C., for example from about 90° C. to about 100° C. High energy inks are solid at a temperature below 40° C. and have a viscosity of from about 5 to about 15 centipoise at a jetting temperature of from about 100° C. to about 180° C., for example from 120° C. to about 160° C. or from about 125° C. to about 150° C.

While certain colorants suitable for use in phase change inks are known, an increase in the range of colorants suitable for use in phase change inks is desirable.

U.S. patent application Ser. No. 13/008,783, filed Jan. 18, 2011, of Maria Birau, et al., entitled "Phase Change Ink Compositions And Colorants For Use In The Same," which is hereby incorporated by reference herein in its entirety, describes in the Abstract thereof phase change ink compositions comprising a novel colorant wax to prevent and/or reduce print head and nozzle contamination in ink jet printers caused by drooling and faceplate staining. In particular, there is provided novel colorants containing acid groups for use in phase change ink compositions and which are compatible with phase change ink components.

There is a growing international trend and customer demand for materials that contain ever-increasing amounts of natural-based materials and/or materials that are biodegradable. Bio-based colorants are generally difficult to disperse in waxy vehicles such as in inks or candles. There is a need for natural-based colorants that can be used in non-aqueous inks, such as non-polar solid inks.

While known compositions and processes are suitable for their intended purposes, a need remains for improved colorants, and more specifically, for improved colorants suitable for use in phase change inks. Additionally, a need remains for improved colorants suitable for use in phase change inks that are natural or derived from natural sources and thus environmentally friendly. There is further a need for phase change ink compositions containing composite materials suitable that contain natural-based materials and/or materials that are biodegradable.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a phase change ink composition comprising a wax; an optional dispersant; an optional synergist; and a naturally-derived colorant wherein the naturally-derived colorant is a colorant derived from a plant, a colorant derived from an insect, or a mixture or combination thereof.

Also described is a method for preparing a phase change ink composition comprising combining a wax; an optional dispersant; an optional synergist; and a naturally-derived colorant wherein the naturally-derived colorant is a colorant derived from a plant, a colorant derived from an insect, or a mixture or combination thereof, to produce a phase change ink composition.

Also described is a method comprising incorporating into an ink jet printing apparatus a phase change ink composition comprising a wax; an optional dispersant; an optional synergist; and a naturally-derived colorant wherein the naturally-derived colorant is a colorant derived from a plant, a colorant derived from an insect, or a mixture or combination thereof, to produce a phase change ink composition; melting the ink composition; and causing droplets of the melted ink to be ejected in an imagewise pattern onto a substrate.

Also described is an ink jet printer stick or pellet a phase change ink composition comprising a wax; an optional dispersant; an optional synergist; and a naturally-derived colorant wherein the naturally-derived colorant is a colorant derived from a plant, a colorant derived from an insect, or a mixture or combination thereof.

BRIEF DESCRIPTION OF THE DRAWING

The patent or application file contains at least one drawing executed in color. Copies of this patent or patent application publication with color drawing(s) will be provided by the Office upon request and payment of the necessary fee.

FIG. 1 illustrates print density before and after lightfastness testing of exemplary prints prepared with phase change inks in accordance with the present disclosure.

DETAILED DESCRIPTION

Provided are phase change ink compositions, in embodiments pigmented phase change ink compositions, comprising an increased percentage of environmentally-friendly components. In some embodiments, the colorants used in the present ink compositions originate from natural sources such as insects and plants and have not undergone any chemical modification. In embodiments, sulfonated colorants have been successfully used as pigment synergists to enhance pigment dispersion and provide pigment dispersions that are stable in solid ink. In some embodiments, different colors were obtained from one pigment when dispersed with different dispersants. That is, the dispersant can be selected to steer the color of the phase change ink herein. The present phase change ink compositions containing naturally-derived colorants can produce vat-like colors.

A phase change ink composition is provided comprising a wax; an optional dispersant; an optional synergist; and a naturally-derived colorant wherein the naturally-derived colorant is a colorant derived from a plant, a colorant derived from an insect, or a mixture or combination thereof.

Naturally-derived colorant as used herein can be described as colorants that exist in nature in the form of plants or insects or that are derived from plants or insects. In embodiments, the naturally-derived colorants herein are colorants that are derived from plants or insects but which are treated or functionalized to add functional groups that the original plant or insect material does not have or that are a synthetically prepared compound that has the structure of a naturally occurring plant or insect. Some naturally-derived colorants derived from plants or insects herein provide thermal stability and good light fastness. It is desirable to be able to use naturally-derived colorants in solid ink.

Natural colorants (consisting of dyes and pigments) can be derived from natural sources all over the world including from plants, animals and microorganisms such as bacteria that extract the colorant of various materials. Most natural colorants fall into six general classes which include tetrapyrroles, tetra-terpenoids, quinines, O-heterocyclic compounds, N-heterocyclic compounds and metallo-proteins. Examples of tetrapyrroles include porphyrins and porphyrin derivatives and more specifically, chlorophylls, heme pigments and bilins. Examples of tetra-terpenoids or carotenoids include carotenes and xanthophylls. Examples of quinines include benzoquinones, anthraquinones and naphthiquinones. Examples of O-heterocyclic compounds such as flavonoids include anthocyanins and flavonols. Examples of N-heterocyclic compounds include indigoids and indole derivatives, such as betalaines and eumelanins, and substituted pyrimidines such as pterins and purines. Examples of metallo-proteins, such as oligomeric proteins, include iron-based proteins such as haemerythrin and myohemerythrin which exhibit color in an oxygenated state. Other examples of natural colorants include lipofuscins and fungal pigments.

Natural colorants have or can be made to have a variety of colors with or without metal complexing agents such as magnesium and iron and/or with or without the use of a mordant such as alum, tin, stannous chloride, copper sulfate and the like. Some natural colorants are prone to oxidation which can result in the natural colorant having a different color before it was oxidized. Described herein are examples of mixtures of modified naturally derived pigments and dispersants that when incorporated into phase change inks impart a grayish or metal-like appearance on a print such as a print on white paper.

Examples of red dyes from natural sources include those from Safflower (*Carthamus tinctorius*), Caesalpina (*Caesalpina sappan*), Maddar (*Rubia tinctorum*), Kermes (*Kermes vermilio*), Drago tree (*Dracaena draco*), Daemonorops (*Daemonorops draco*), Cochineal (*Dactylopiuscoccus coccus*) and Lac (*Coccus lacca*). Examples of yellow dyes from natural sources include those from Bougainvillea (*Bougainvillea glabra*), Golden rod (*Solidago grandis*), Teak (*Tectona grandis*), Marigold (*Tagetes* species), Weld (*Reseda luteola*), Saffron (*Crocus sativus*) and Parijata (*Nyetanthasar bortristis*). Examples of blue or blue-like (such as purple) dyes from natural sources include those from Indigo (*Indigofera tinctoria*), Woad (*Isatis tinctoria*), Suntberry (*Acacia nilotica*), Pivet (*Ligustrum vulgare*), molluscs such as *Bolinus brandaris, Hexaplex trunculus* and *Stramonita haemastoma*, Murasaki (*Lithospermum erythrorhizon*) and Water lily (*Nymphaea alba*). Examples of green dyes from natural sources include those from Tulsi (*Ocimum sanctum*), Bougainvillea (*Bougainvillea glabra*), Canna, Lily (*Convallaria majalis*) and Nettles (*Urtica diocia*). Examples of orange or orange-like dyes from natural sources include those from Bougainvillea (*Bougainvillea glabra*), Balsam (*Impatiens balsamina*), Dahlia (*Dahlia* species) and Annatto (*Bixa orellana*). Examples of brown dyes from natural sources include those from Caesalpina (*Caesalpina sappan*), Bougainvillea (*Bougainvillea glabra*), Balsam (*Impatiens balsamina*), Marigold (*Tagetes* species), Balsam (*Impatiens balsamina*) and Blackberries (*Rubus fructicosus*). Examples of black dyes from natural sources include those from Lac (*Coccus lacca*), Alder (*Almus glutinosa*), Rofblamala (*Loranthus pentapetalus*), Custard apple (*Anona reticulata*) and Harda (*Terminalia chebula*).

To achieve a desired color or effect, two or more natural colorants may be mixed together in any proportion to achieve that desired color or effect. Two or more natural colorants may be present in a given natural colorant compound.

Natural colorants such as indigo, referenced as C.I. Pigment Blue 66, C.I. Vat Blue 1 and C.I. Reduced Vat Blue 1 (all listed as C.I. 73000) and its variants thereof, and alizarin, referenced as C.I. Mordant Red 11 (listed as C.I. 58000) and their variants thereof are known as "ancient blues" and "ancient reds", respectively, and played important roles as colorants for several ancient civilizations.

Any suitable or desired naturally-derived colorant can be used in the phase change ink compositions herein. The naturally-derived colorant is a colorant derived from a plant, a colorant derived from an insect, or a mixture or combination thereof.

In certain embodiments, the naturally-derived colorant is a colorant derived from madder, a colorant derived from woad, a colorant derived from lac, a colorant derived from cochineal, a colorant derived from turmeric, or a mixture or combination thereof.

In other embodiments, the modified naturally-derived colorant can be derived from indirubin (also known as Indigo Red (CAS No. 75790)) of the formula

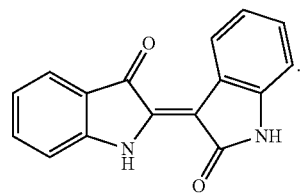 [SMILES: O=C1Nc2ccccc2/C1=C1/Nc2ccccc2C1=O]

In still other embodiments, the modified naturally-derived colorant can be derived from indigoids and indirubinoids including those of the formulae

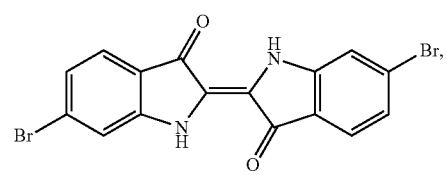

-continued

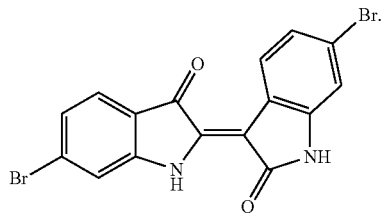

In other embodiments, the modified naturally-derived colorant can be derived from Alizarin purpurin (referenced as C.I. Natural Red 8 and C.I. Natural Red 16 and listed as C.I. 75410 and also known as Indigo Red) of the formula

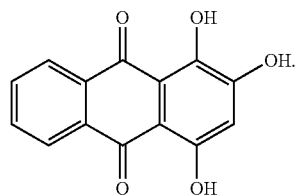 [SMILES: O=C1c2ccccc2C(=O)c2c(O)c(O)cc(O)c21]

In further embodiments, the modified naturally-derived colorants can be derived from naturally occurring anthraquinoids, such as those shown in Table 1, as related to the formula

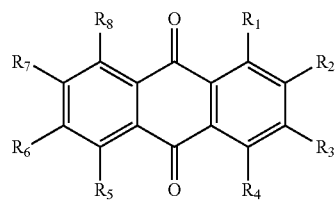

wherein $R_1$ through $R_8$ are selected as shown in Table 1.

TABLE 1

| Dye Component | Substituents | | | | | | | |
|---|---|---|---|---|---|---|---|---|
| | $R_1$ | $R_2$ | $R_3$ | $R_4$ | $R_5$ | $R_6$ | $R_7$ | $R_8$ |
| Madder Plant | | | | | | | | |
| Alizarin | OH | OH | | | | | | |
| Purpurin | OH | OH | | OH | | | | |
| Insects | | | | | | | | |
| Carminic acid | $CH_3$ | COOH | OH | | OH | OH | (c) | OH |
| Flavokermesic acid | $CH_3$ | COOH | OH | | | OH | | OH |
| Kermesic acid | $CH_3$ | COOH | OH | | OH | OH | | OH |
| Laccaic acid A | COOH | COOH | OH | | OH | OH | (a) | OH |
| Laccaic acid B | COOH | COOH | OH | | OH | OH | (b) | OH |

The (a), (b) and (c) designations in Table 1 refer to the following formulae

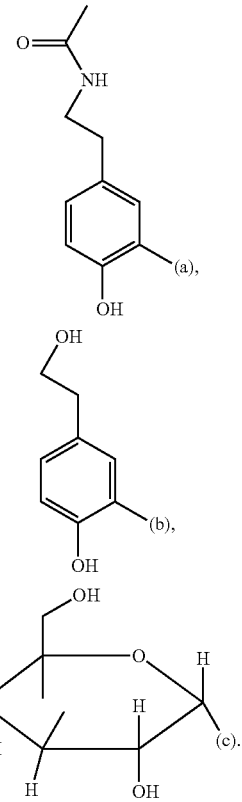

In embodiments, naturally-derived colorants herein include "ancient blues" (woad—indigo) and "anthraquinone reds" (madder—alizarin, cochineal and lac). Colorants containing anthraquinone and its derivatives can be obtained from parasitic insects such as *Dactylopius coccus* (for cochineal) and *Kerria lacca* (for lac). Madder (alizarin) can be extracted from the dried roots of the Rubia plant, and indigo can be extracted from *Isatis tinctoria* (woad) or *Indigofera tinctoria*. Madder (Alizarin) is of the formula

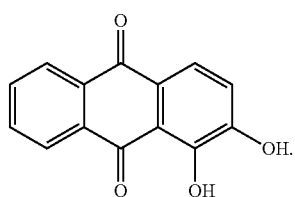 [SMILES: O=C1c2ccccc2C(=O)c2c1ccc(O)c2O]

Woad (Indigo) is of the formula

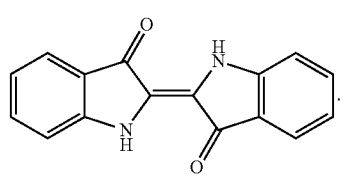 [SMILES: O=C1/C(=C2\Nc3ccccc3C2=O)Nc2ccccc21]

Lac is of the formula

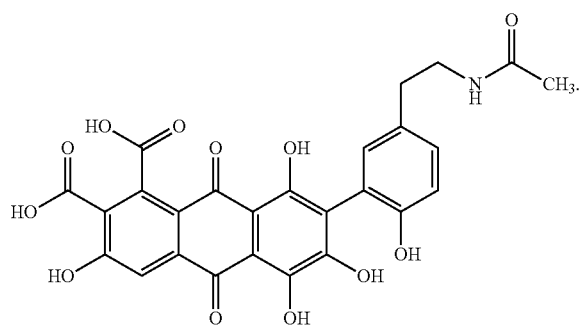

Cochineal is of the formula

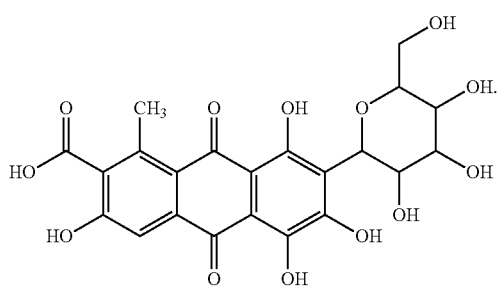

In embodiments, the naturally-derived colorants, for example, cochineal and lac, present a variety of functional groups that can act as attachment points for the dispersant to bind onto the pigment. Certain naturally-derived colorants, for example, alizarin and woad (indigo), are mostly devoid of functionality and are extremely challenging to be dispersed in solid ink. In embodiments, a synergist is employed to enable dispersant attachment onto the pigment and stabilization in solid ink.

Tumeric (Curcuma) can be selected as a yellow naturally-derived colorant herein. Pigments obtained in the colorant extracts from Curcuma are collectively known as curcuminoids of the formula

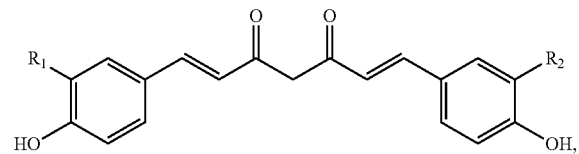

the major component being curcumin wherein $R_1$ is $OCH_3$ and $R_2$ is $OCH_3$;

along with small amounts of demethoxycurcumin and bis-demethoxy curcumin, wherein in demethoxycurcumin $R_1$ is $OCH_3$ and $R_2$ is hydrogen; and wherein in bisdemethoxycurcumin $R_1$ and $R_2$ are both hydrogen.

The phase change ink composition can optionally contain a dispersant. Any suitable or desired dispersant can be employed. In embodiments, the dispersant can be a dispersant described in U.S. Pat. No. 7,973,186 of Adela Goredema, et al., which is hereby incorporated by reference herein in its entirety. In embodiments, the dispersant is a compound of the formula

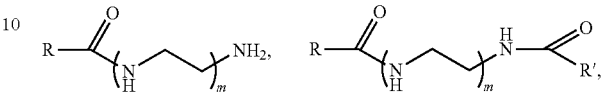

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30. The dispersant can optionally be a polymeric dispersant such as those sold under the name Solsperse®, in embodiments, Solsperse® 17000, available from The Lubrizol Corporation.

In embodiments, amphipathic dispersants comprising a polar head group comprising multiple amine groups and a long chain, non-polar tail can be selected. In certain embodiments, polyethyleneimine based dispersants, which have terminal or secondary amines that can combine with the free acid groups on the synergist. In certain embodiments, the dispersant can be a polyethyleneimine dispersant, as described in Example 1 of U.S. Pat. No. 7,973,186, which is hereby incorporated by reference herein in its entirety.

In certain embodiments, the dispersant can be a polyethyleneamine based dispersant, such as such as Solsperse® 13240 available from The Lubrizol Corporation.

In embodiments, the dispersant can be selected to steer the color of the phase change ink.

The phase change ink compositions herein can further include any suitable or desired synergist. A synergist is a compound containing functional groups which promote the attachment of the dispersant to the colorant, in embodiments, to the pigment, to be dispersed. A synergist can comprise another colorant, in embodiments, another pigment, having a similar or identical structure to the pigment to be dispersed. Currently, there are no known available synergists for natural pigments.

In embodiments herein, Indigo Carmine of the formula

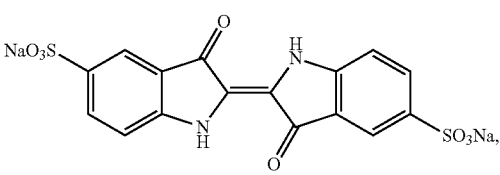

and modified Indigo Carmine as described in U.S. patent application Ser. No. 13/690,857, filed of even date herewith, which is hereby incorporated by reference herein in its entirety, of the formula

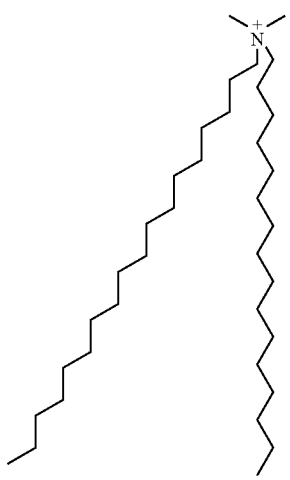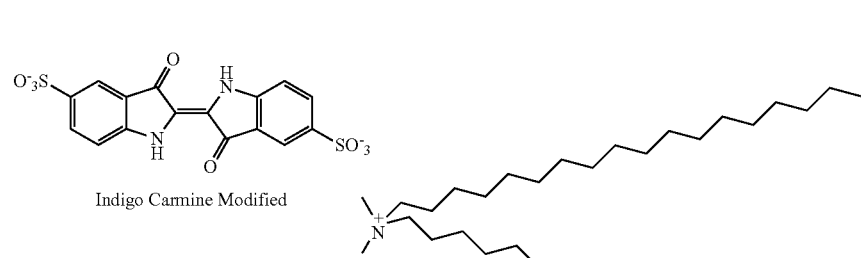
can be selected as synergists for the phase change ink compositions herein. In certain embodiments, Indigo Carmine, modified Indigo Carmine, or a mixture or combination thereof can be used as synergist to disperse woad in the present phase change ink compositions.
In certain embodiments, the synergist is a compound of the formula
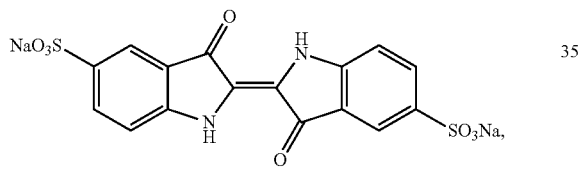
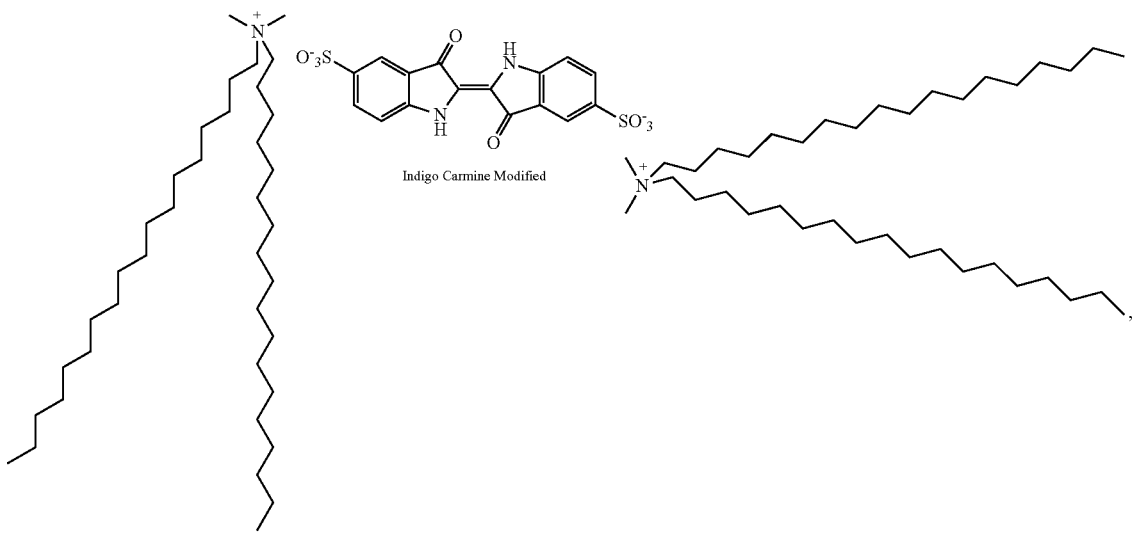

-continued
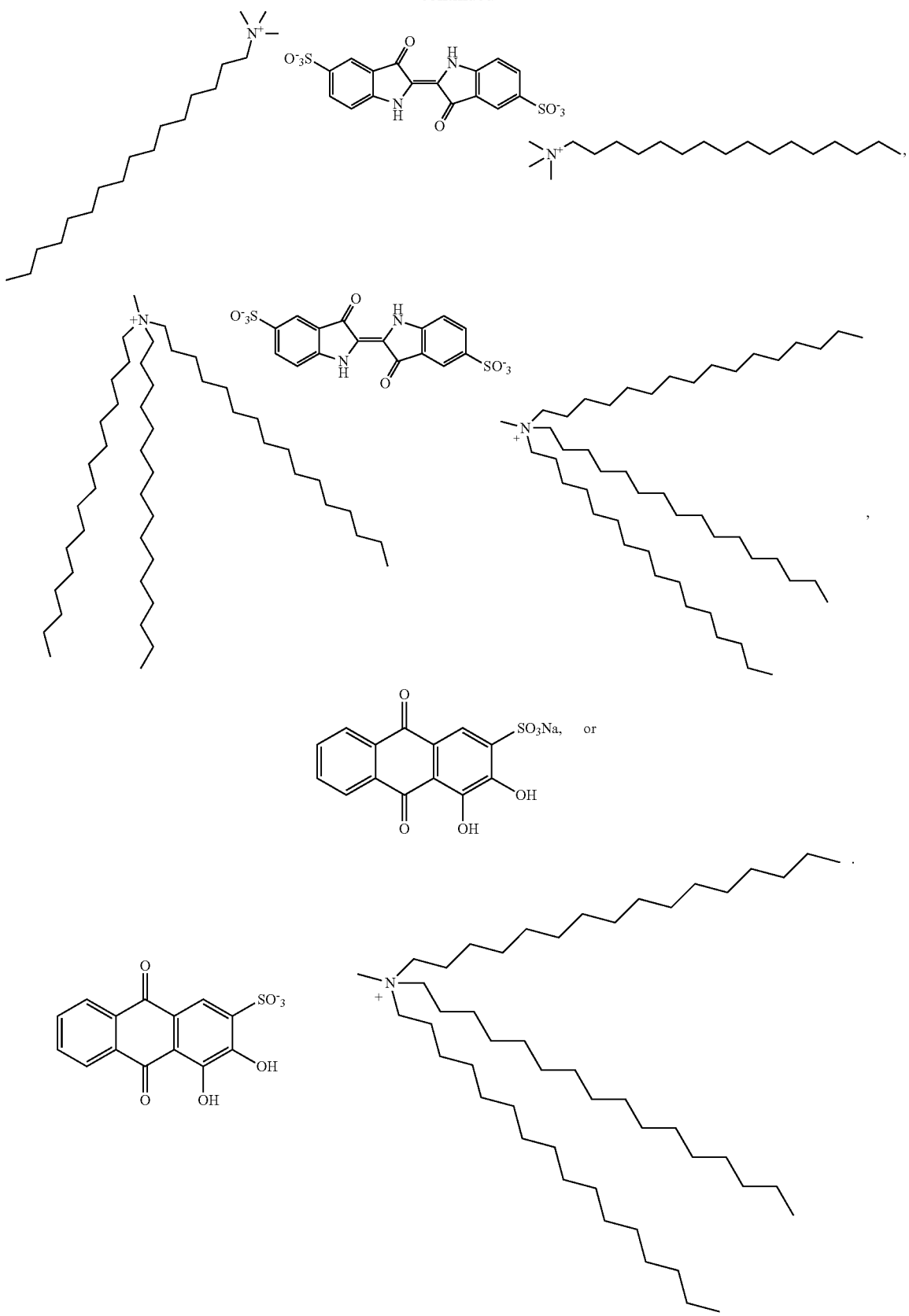

In embodiments, the synergist is Indigo Carmine and the dispersant is a compound as described in Example 1 of U.S. Pat. No. 7,973,186, which is hereby incorporated by reference herein in its entirety.

In other embodiments, a copper phthalocyanine derivative can be employed as a synergist for the phase change inks herein.

The synergist can be provided in the phase change ink composition in any suitable or desired amount. In embodiments, the synergist can be present in an amount of from about 1 to about 300 percent, or from about 10 to about 200 percent, or from about 30 to about 150 percent total synergist, based on the total weight of the pigment in the phase change ink composition.

The phase change ink compositions herein can further include a wax. The phase change ink compositions can include any suitable ink vehicle such as paraffins, microcrystalline waxes, polyethylene waxes, ester waxes, amides, fatty acids and other waxy materials, fatty amide containing materials, sulfonamide materials, resinous materials made from different natural sources (tall oil rosins and rosin esters, for example), and many synthetic resins, oligomers, polymers, and copolymers such as further discussed below.

In embodiments, the phase change ink compositions herein include a polyalkylene wax. In specific embodiments, the wax is a polymethylene wax, a polyethylene wax, or a mixture of combination thereof.

In certain embodiments, the phase change ink compositions herein include a biodegradable wax. In embodiments, the biodegradable wax is a biodegradable polyethylene wax. For example, the wax can be a biodegradable polyethylene wax sold under the name Accumelt® 78, from IGI Waxes.

In embodiments, the phase change ink compositions herein further comprise a low melting wax. In embodiments, the low melting wax is a polyalkylene wax, a functional wax, or a combination thereof. The term "functional wax" is known to one of skill in the art and can mean herein any suitable functional wax, in embodiments, including, but not limited to, a wax with polar groups, for example, alcohols, amides, esters, urethanes, etc. As used herein, the term "low melting wax" includes any suitable low melting wax, including, in embodiments, a wax having a melting point of less than about 120° C.

Examples of suitable amides include, for example, diamides, triamides, tetra-amides, cyclic amides and the like. Suitable triamides include, for example, those disclosed in U.S. Pat. No. 6,860,930, the entire disclosure of which is incorporated herein by reference. Suitable other amides, such as fatty amides including monoamides, tetra-amides, and mixtures thereof, are disclosed in, for example, U.S. Pat. Nos. 4,889,560, 4,889,761, 5,194,638, 4,830,671, 6,174,937, 5,372,852, 5,597,856, and 6,174,937, and British Patent No. GB 2 238 792, the entire disclosures of each are incorporated herein by reference.

The wax can be present in the phase change ink composition in any suitable or desired amount. In embodiments, the wax is present in the phase change ink composition in an amount of from about 25 percent to about 65 percent by weight based on the total weight of the dye-based phase change ink composition. In embodiments, the wax is a low melting wax present in the phase change ink composition in an amount of from about 25% to less than about 65% by weight based on the total weight of the ink carrier.

Other suitable carrier materials that can be used in the phase change ink composition include isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. Nos. 5,750,604, 5,780, 528, 5,782,966, 5,783,658, 5,827,918, 5,830,942, 5,919,839, 6,255,432, and 6,309,453, British Patents Nos. GB 2 294 939, GB 2 305 928, GB 2 305 670, and GB 2 290 793, and PCT Publications WO 94/14902, WO 97/12003, WO 97/13816, WO 96/14364, WO 97/33943, and WO 95/04760, the entire disclosures of each of which are incorporated herein by reference.

Further examples of suitable ink vehicles include ethylene/propylene copolymers, such as those available from Baker Petrolite. Commercial examples of such copolymers include, for example, Petrolite CP-7 (Mn=650), Petrolite CP-11 (Mn=1,100, Petrolite CP-12 (Mn=1,200) and the like. The copolymers may have, for example, a melting point of from about 70° C. to about 150° C., such as from about 80° C. to about 130° C. or from about 90° C. to about 120° C. and a molecular weight range (Mn) of from about 500 to about 4,000.

Another type of ink vehicle may be n-paraffinic, branched paraffinic, and/or naphthenic hydrocarbons, typically with from about 5 to about 100, such as from about 20 to about 80 or from about 30 to about 60 carbon atoms, generally prepared by the refinement of naturally occurring hydrocarbons, such as BE SQUARE® 185 and BE SQUARE® 195, with molecular weights (Mn) of from about 100 to about 5,000, such as from about 250 to about 1,000 or from about 500 to about 800, for example such as available from Baker Petrolite.

Highly branched hydrocarbons, typically prepared by olefin polymerization, such as the VYBAR® materials available from Baker Petrolite, including VYBAR® 253 (Mn=520), VYBAR® 5013 (Mn=420), and the like, may also be used. In addition, the ink vehicle may be an ethoxylated alcohol, such as available from Baker Petrolite and of the general formula

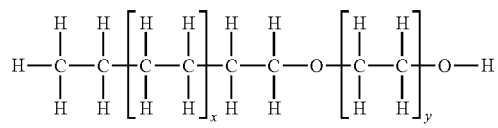

wherein x is an integer of from about 1 to about 50, such as from about 5 to about 40 or from about 11 to about 24 and y is an integer of from about 1 to about 70, such as from about 1 to about 50 or from about 1 to about 40. The materials may have a melting point of from about 60° C. to about 150° C., such as from about 70° C. to about 120° C. or from about 80° C. to about 110° C. and a molecular weight (Mn) range of from about 100 to about 5,000, such as from about 500 to about 3,000 or from about 500 to about 2,500. Commercial examples include UNITHOX® 420 (Mn=560), UNITHOX® 450 (Mn=900), UNITHOX® 480 (Mn=2,250), UNITHOX® 520 (Mn=700), UNITHOX® 550 (Mn=1,100), UNITHOX® 720 (Mn=875), UNITHOX 750 (Mn=1,400), and the like.

As an additional example, the ink vehicle may be made of fatty amides, such as monoamides, tetra-amides, mixtures thereof, and the like, for example such as described in U.S. Pat. No. 6,858,070, which is hereby incorporated herein by reference. Suitable monoamides may have a melting point of at least about 50° C., for example from about 50° C. to about 150° C., although the melting point can be outside these ranges. Specific examples of suitable monoamides include, for example, primary monoamides and secondary monoamides. stearamide, such as KEMAMIDE® S available from Witco Chemical Company and CRODAMIDE® S available from Croda, behenamide/arachidamide, such as KEMAMIDE® B available from Witco and CRODAMIDE® BR available from Croda, oleamide, such as KEMAMIDE® U available from Witco and CRODAMIDE® OR available from Croda, technical grade oleamide, such as KEMAMIDE® 0 available from Witco, CRODAMIDE® 0 available from Croda, and UNISLIP® 1753 available from Uniqema, and erucamide such as KEMAMIDE® E available from Witco and CRODAMIDE® ER available from Croda, are some examples of suitable primary amides. Behenyl behenamide, such as KEMAMIDE® EX666 available from Witco, stearyl stearamide, such as KEMAMIDE® S-180 and KEMAMIDE® EX-672 available from Witco, stearyl erucamide, such as KEMAMIDE® E-180 available from Witco and CRODAMIDE® 212 available from Croda, erucyl erucamide, such as KEMAMIDE® E-221 available from Witco, oleyl palmitamide, such as KEMAMIDE® P-181 available from Witco and CRODAMIDE® 203 available from Croda, and erucyl stearamide, such as KEMAMIDE® S-221 available from Witco, are some examples of suitable secondary amides. Additional suitable amide materials include KEMAMIDE® W40 (N,N'-ethylenebisstearamide), KEMAMIDE® P181 (oleyl palmitamide), KEMAMIDE® W45 (N,N'-ethylenebisstearamide), and KEMAMIDE® W20 (N,N'-ethylenebisoleamide). In embodiments, the phase change ink composition includes (a) stearyl stearamide, (b) a dimer acid based tetra-amide that is the reaction product of dimer acid, ethylene diamine, and stearic acid, or (c) mixtures thereof. The phase change ink composition can include a mixture of one or more amides and one or more isocyanate-derived materials.

High molecular weight linear alcohols, such as those available from Baker Petrolite and of the general formula

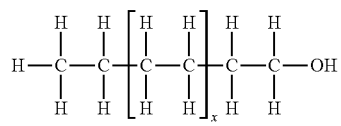

wherein x is an integer of from about 1 to about 50, such as from about 5 to about 35 or from about 11 to about 23, may also be used as the ink vehicle. These materials may have a melting point of from about 50° C. to about 150° C., such as from about 70° C. to about 120° C. or from about 75° C. to about 110° C., and a molecular weight (Mn) range of from about 100 to about 5,000, such as from about 200 to about 2,500 or from about 300 to about 1,500. Commercial examples include the UNILIN® materials such as UNILIN® 425 (Mn=460), UNILIN® 550 (Mn=550), UNILIN® 700 (Mn=700), and distilled alcohols, the viscosity of which at the jetting temperature in one embodiment can be from about 5 to about 50% higher than the non-distilled alcohol.

A still further example includes hydrocarbon-based waxes, such as the homopolymers of polyethylene available from Baker Petrolite and of the general formula

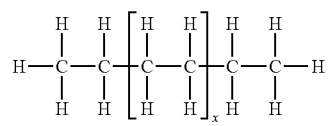

wherein x is an integer of from about 1 to about 200, such as from about to about 150 or from about 12 to about 105. These materials may have a melting point of from about 60° C. to about 150° C., such as from about 70° C. to about 140° C. or from about 80° C. to about 130° C. and a molecular weight (Mn) of from about 100 to about 5,000, such as from about 200 to about 4,000 or from about 400 to about 3,000. Example waxes include PW400 (Mn about 400), distilled PW400, in one embodiment having a viscosity of about 10% to about 100% higher than the viscosity of the undistilled POLYWAX® 400 at about 110° C., POLYWAX 500 (Mn about 500), distilled POLYWAX® 500, in one embodiment having a viscosity of about 10% to about 100% higher than the viscosity of the undistilled POLYWAX® 500 at about 11° C., POLYWAX 655 (Mn about 655), distilled POLYWAX® 655, in one embodiment having a viscosity of about 10% to about 50% lower than the viscosity of the undistilled POLYWAX® 655 at about 110° C., and in yet another embodiment having a viscosity of about 10% to about 50% higher than the viscosity of the undistilled POLYWAX® 655 at about 110° C. POLYWAX 850 (Mn about 850), POLYWAX 1000 (Mn about 1,000), and the like.

Another example includes modified maleic anhydride hydrocarbon adducts of polyolefins prepared by graft copolymerization, such as those available from Baker Petrolite and of the general formulas

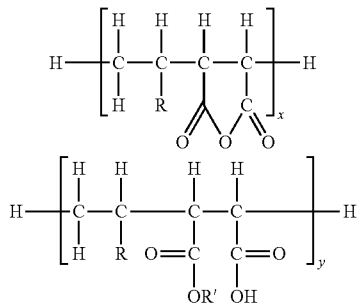

wherein R is an alkyl group with from about 1 to about 50, such as from about 5 to about 35 or from about 6 to about 28 carbon atoms, R' is an ethyl group, a propyl group, an isopropyl group, a butyl group, an isobutyl group, or an alkyl group with from about 5 to about 500, such as from about 10 to about 300 or from about 20 to about 200 carbon atoms, x is an integer of from about 9 to about 13, and y is an integer of from about 1 to about 50, such as from about 5 to about 25 or from about 9 to about 13, and having melting points of from about 50° C. to about 150° C., such as from about 60° C. to about 120° C. or from about 70° C. to about 100° C.; and those available from Baker Petrolite and of the general formula

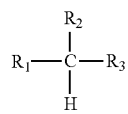

wherein $R_1$ and $R_3$ are hydrocarbon groups and $R_2$ is either of one of the general formulas

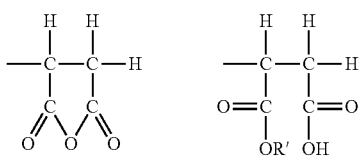

or a mixture thereof, wherein R' is an isopropyl group, which materials may have melting points of from about 70° C. to about 150° C., such as from about 80° C. to about 130° C. or from about 90° C. to about 125° C., with examples of modified maleic anhydride copolymers including CERAMER® 67 (Mn=655, Mw/Mn=1.1), CERAMER® 1608 (Mn=700, Mw/Mn=1.7), and the like.

Additional examples of suitable ink vehicles for the phase change inks include rosin esters; polyamides; dimer acid amides; fatty acid amides, including ARAMID® C; epoxy resins, such as EPOTUF® 37001, available from Riechold Chemical Company; fluid paraffin waxes; fluid microcrystalline waxes; Fischer-Tropsch waxes; polyvinyl alcohol resins;

polyols; cellulose esters; cellulose ethers; polyvinyl pyridine resins; fatty acids; fatty acid esters; poly sulfonamides, including KETJENFLEX® MH and KETJENFLEX® MS80; benzoate esters, such as BENZOFLEX® 5552, available from Velsicol Chemical Company; phthalate plasticizers; citrate plasticizers; maleate plasticizers; sulfones, such as diphenyl sulfone, n-decyl sulfone, n-arnyl sulfone, chlorophenyl methyl sulfone; polyvinyl pyrrolidinone copolymers; polyvinyl pyrrolidone/polyvinyl acetate copolymers; novolac resins, such as DUREZ® 12 686, available from Occidental Chemical Company; and natural product waxes, such as beeswax, monton wax, candelilla wax, OILS ONITE® (American Gilsonite Company), and the like; mixtures of linear primary alcohols with linear long chain amides or fatty acid amides, such as those with from about 6 to about 24 carbon atoms, including PARICIN® 9 (propylene glycol monohydroxystearate), PARICIN® 13 (glycerol monohydroxystearate), PARICIN® 15 (ethylene glycol monohydroxystearate), PARICIN® 220 (N(2-hydroxyethyl)-12-hydroxystearamide), PARICIN® 285 (N,N'-ethylene-bis-12-hydroxystearamide), FLEXRICIN® 185 (N,N'-ethylene-bis-ricinoleamide), and the like. Further, linear long chain sulfones with from about 4 to about 16 carbon atoms, such as n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, and the like, are suitable ink vehicle materials.

In addition, the ink vehicles described in U.S. Pat. No. 6,906,118, which is incorporated herein by reference, may also be used. The ink vehicle may contain a branched triamide such as those described in U.S. Pat. No. 6,860,930, the disclosure of which is also incorporated by reference herein,

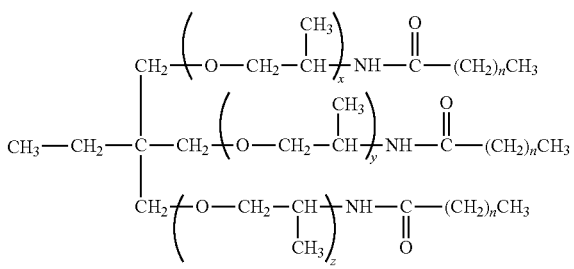

wherein n has an average value of from about 34 equal to or less than 40, where x, y and z can each be zero or an integer, and wherein the sum of x, y, and z is from about 5 and equal to or less than 6.

Optionally, a plasticizer, which can be either a solid or liquid plasticizer, such as benzyl phthalates, triaryl phosphate esters, pentaerythritol tetrabenzoate, dialkyl adipate, dialkyl phthalates, dialkyl sebacate, alkyl benzyl phthalates, ethylene glycol monostearate, glycerol monostearate, propylene glycol monostearate, dicyclohexyl phthalate, diphenyl isophthalate, triphenyl phosphate, dimethyl isophthalate, and mixtures thereof, or the like can also be included in the ink carrier. The plasticizer is present in the ink carrier in any desired or effective amount, such as from about 0.05% by weight of the ink carrier. Examples of suitable plasticizers include SANTICIZER® 278, SANTICIZER® 154, SANTICIZER®160, SANTICIZER® 261 (commercially available from Monsanto), and the like or mixtures thereof.

A hindered amine antioxidant can optionally be present in the ink in any desired or effective amount, such as from about 0.001 percent to about 0.50 percent by weight of the total ink composition.

Examples of suitable hindered amine antioxidants include those of general formula

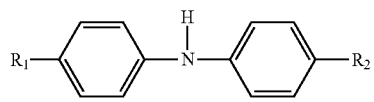

wherein $R_1$ and $R_2$ each, independently of the other, can be a hydrogen atom or an alkyl group, including linear, branched, saturated, unsaturated, cyclic, substituted, and unsubstituted alkyl groups, and wherein hetero atoms, such as oxygen, nitrogen, sulfur, silicon, phosphorus, boron, either may or may not be present in the alkyl group, in one embodiment with at least 1 carbon atom, if substituted, substitutions can be alkyl or phenyl.

Specific examples of suitable hindered amine antioxidants include the following antioxidants commercially available from Crompton; NAUGUARD® 445 where $R_1=R_2=C(CH_3)_2Ph$, NAUGUARD® 635 where $R_1=R_2=\!\!-\!\!CH(CH_3)Ph$, NAUGUARD® PS-30 where $R_1=C_4$ or $C_8$, $R_2=C_4$ or $C_8$ and the like.

A hindered phenol antioxidant can also be provided. In one embodiment the hindered phenol is present in a relatively high concentration. A high concentration of hindered phenol antioxidant maximizes long term thermal stability by delaying the onset of the oxidation itself. The hindered phenol antioxidant is present in the ink in any desired or effective amount, in embodiments from about 0.01% to about 4.0% by weight of the total ink composition. Specific examples of suitable hindered phenol antioxidants include ETHANOX® 330, ETHANOX® 310, ETHANOX® 314, ETHANOX® 376 (commercially available from Albemarle) and the like. Also commercially available from Ciba Specialty Chemicals are IRGANOX® 1010, IRGANOX® 1035, IRGANOX®1076, IRGANOX® 1330 and the like. Mixtures of two or more of these hindered phenol antioxidants can also be employed.

A rosin ester resin, mixtures thereof, or the like can also be included in the dye-based phase change ink composition. The rosin ester resin is present in any desired or effective amount, in embodiments from 0.5% to about 20% by weight of the total ink composition. Examples of suitable rosin ester resins include Pinecrystal KE-100 (commercially available from Arakawa), and the like.

The phase change ink composition can include ink carrier comprising wax and other optional carrier components in any desired or effective amount, in one embodiment in an amount of at least about 50% to about 99 by total weight of the phase change ink composition, although the amount can be outside of this range. In certain embodiments, the ink carrier can be present in an amount of from about 25% to about 65% by total weight of the phase change ink composition.

The phase change ink compositions herein can optionally contain any suitable or desired additional colorant selected from the group consisting of traditional dyes, pigments, and mixtures and combinations thereof, in addition to the present naturally-derived colorants. If more than one colorant is included, the total amount of colorant present in the phase change ink composition can be any desired or effective amount to obtain the desired color or hue, in embodiments from about 0.1 to about 50 percent, or from about 0.1 percent to about 20 percent total colorant by weight based on the total weight of the phase change ink composition.

Any desired or effective colorant can be employed as the optional additional colorant in the inks, including dyes, pigments, mixtures thereof, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon® Red 492 (BASF); Orasol® Red G (Pylam Products); Direct Brilliant Pink B (Oriental Giant Dyes); Direct Red 3BL (Classic Dyestuffs); Supranol® Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol® Brilliant Yellow 4GF (Clariant); Cibanone Yellow 2G (Classic Dyestuffs); Orasol® Black RLI (BASF); Orasol® Black CN (Pylam Products); Savinyl Black RLSN (Clariant); Pyrazol Black BG (Clariant); Morfast® Black 101 (Rohm & Haas); Diaazol Black RN (ICI); Thermoplast® Blue 670 (BASF); Orasol® Blue GN (Pylam Products); Savinyl Blue GLS (Clariant); Luxol Fast Blue MBSN (Pylam Products); Sevron Blue 5GMF (Classic Dyestuffs); Basacid® Blue 750 (BASF); Keyplast Blue (Keystone Aniline Corporation); Neozapon® Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen® Blue FF-4012 (BASF); Fastol® Black BR (C.I. Solvent Black 35) (Chemische Fabriek Triade BV); Morton Morplas Magenta 36 (C.I. Solvent Red 172); metal phthalocyanine colorants, such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are hereby incorporated by reference herein in their entireties, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint® Orange X-38, uncut Reactint® Blue X-17, Solvent Yellow 162, Acid Red 52, Solvent Blue 44, and uncut Reactint® Violet X-80.

Pigments are also suitable optional additional colorants for the phase change ink. Examples of suitable pigments include PALIOGEN® Violet 5100 (BASF); PALIOGEN® Violet 5890 (BASF); HELIOGEN® Green L8730 (BASF); LITHOL® Scarlet D3700 (BASF); SUNFAST® Blue 15:4 (Sun Chemical); Hostaperm® Blue B2G-D (Clariant); Hostaperm® Blue B4G (Clariant); SPECTRA® PAC C Blue 15:4 (Sun Chemical); Permanent Red P-F7RK; Hostaperm® Violet BL (Clariant); LITHOL® Scarlet 4440 (BASF); Bon Red C (Dominion Color Company); ORACET® Pink RF (BASF); PALIOGEN® Red 3871 K (BASF); SUNFAST® Blue 15:3 (Sun Chemical); PALIOGEN® Red 3340 (BASF); SUNFAST® Carbazole Violet 23 (Sun Chemical); LITHOL® Fast Scarlet L4300 (BASF); SUNBRITE® Yellow 17 (Sun Chemical); HELIOGEN® Blue L6900, L7020 (BASF); SUNBRITE® Yellow 74 (Sun Chemical); SPECTRA® PAC C Orange 16 (Sun Chemical); HELIOGEN® Blue K6902, K6910 (BASF); SUNFAST® Magenta 122 (Sun Chemical); HELIOGEN® Blue D6840, D7080 (BASF); Sudan Blue OS (BASF); NEOPEN® Blue FF4012 (BASF); PV Fast Blue B2GO1 (Clariant); IRGALITE® Blue GLO (BASF); PALIOGEN® Blue 6470 (BASF); Sudan Orange G (Aldrich); Sudan Orange 220 (BASF); PALIOGEN® Orange 3040 (BASF); PALIOGEN® Yellow 152, 1560 (BASF); LITHOL® Fast Yellow 0991 K (BASF); PALIOTOL® Yellow 1840 (BASF); NOVOPERM® Yellow FGL (Clariant); Ink Jet Yellow 4G VP2532 (Clariant); Toner Yellow HG (Clariant); Lumogen® Yellow D0790 (BASF); Suco-Yellow L1250 (BASF); Suco-Yellow D1355 (BASF); Suco Fast Yellow D1355, D1351 (BASF); HOSTAPERM® Pink E 02 (Clariant); Hansa Brilliant Yellow 5GX03 (Clariant); Permanent Yellow GRL 02 (Clariant); Permanent Rubine L6B 05 (Clariant); FANAL® Pink D4830 (BASF); CINQUASIA® Magenta (DU PONT); PALIOGEN® Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are hereby totally incorporated by reference herein in their entireties.

The phase ink compositions of the present disclosure can be prepared by any desired or suitable method. In embodiments, a method for preparing a phase change ink composition comprises combining a wax; an optional dispersant, an optional synergist, and a naturally-derived colorant wherein the naturally-derived colorant is a colorant derived from a plant, a colorant derived from an insect, or a mixture or combination thereof, to produce a phase change ink composition. For example, the ink ingredients can be mixed together, followed by heating, to a temperature of at least about 100° C. to no more than about 140° C., although the temperature can be outside of this range, and stiffing until a homogeneous ink composition is obtained, followed by cooling the ink to ambient temperature (typically from about 20 to about 25° C.). The inks of the present disclosure are solid at ambient temperature. In a specific embodiment, during the formation process, the inks in their molten state are poured into molds and then allowed to cool and solidify to form ink sticks.

In embodiments, an ink jet printer stick or pellet a phase change ink composition is provided comprising a wax; an optional dispersant; an optional synergist; and a naturally-derived colorant wherein the naturally-derived colorant is a colorant derived from a plant, a colorant derived from an insect, or a mixture or combination thereof.

In one specific embodiment, the ink carrier has a melting point of less than about 110° C., and in another embodiment of less than about 100° C., although the melting point of the ink carrier can be outside of these ranges. The phase change ink compositions disclosed herein in one embodiment have melting points in one embodiment equal to or less than about 130° C., in another embodiment equal to or less than about 120° C., in a further embodiment equal to or less than about 110° C., and in still another embodiment equal to or less than about 100° C., although the melting point can be outside of these ranges.

The phase change ink compositions prepared by the process disclosed herein generally have melt viscosities, at the jetting temperature which can be equal to or less than about 145° C., in one embodiment equal to or less than about 130° C., and in another embodiment equal to or less than about 120° C., in a further embodiment equal to or less than about 110° C., and in yet another embodiment equal to or less than about 80° C., although the jetting temperature can be outside of these ranges, which are in one embodiment equal to or less than about 30 centipoise (cps), in another embodiment equal to or less than about 25 cps, and in yet a further embodiment equal to or less than about 20 cps, and in another embodiment no less than about 2 cps, in a further embodiment no less than about 3 cps, and in yet a further embodiment no less than about 4 cps, although the melt viscosity can be outside of these ranges.

In certain embodiments, the phase change ink composition herein has a jetting temperature of from about 100° C. to about 130° C.

In embodiments, the phase change ink composition herein has a viscosity of about 9 to about 12 centipoise at 110° C. In certain embodiments, the phase change ink composition herein has a viscosity of about 10 centipoise at 110° C.

The inks disclosed herein can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195, 430, the disclosure of which is totally incorporated herein by reference. The inks prepared as disclosed herein can be employed in apparatus for indirect (offset) printing ink jet applications. Another embodiment is directed to a process which comprises incorporating an ink prepared as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

Any suitable substrate or recording sheet can be employed, including plain papers such as XEROX® 4024 papers, XEROX® Image Series papers, Courtland® 4024 DP® paper, ruled notebook paper, bond paper, silica coated papers such as Sharp Company silica coated paper, JuJo® paper, Hammermill® Laserprint Paper, and the like, transparency materials, fabrics, textile products, plastics, polymeric films, inorganic substrates such as metals and wood, and the like.

The present disclosure is also directed to a printer containing the phase change ink compositions described herein. Further, the present disclosure relates to an ink jet stick or pellet containing the phase change ink compositions described herein, as well as to a printer containing the ink jet stick or pellet.

EXAMPLES

The following Examples are being submitted to further define various species of the present disclosure. These Examples are intended to be illustrative only and are not intended to limit the scope of the present disclosure. Also, parts and percentages are by weight unless otherwise indicated. The components used in the following examples are presented in Table 2 below.

TABLE 2

| Ink Base Component | Details |
| --- | --- |
| Wax A | A fractionated polymethylene wax available from The International Group, Inc. |
| Wax B | Accumelt ® 78 biodegradable polyethylene wax available from The International Group, Inc. |
| Triamide wax | As prepared in Example II of U.S. Pat. No. 6,860,930 |
| Kemamide ® S-180 | Stearyl stearamide available from Witco Chemical Corporation |

TABLE 2-continued

| Ink Base Component | Details |
| --- | --- |
| KE-100 | an ester of tetrahydroabietic acid and glycerol available from Arakawa Industries |
| Urethane resin | As prepared in Example 4 of U.S. Pat. No. 6,309,453 |
| Naugard ® 445 | Antioxidant available from Crompton Corporation |
| Solsperse ® 17000 | A dispersant available from The Lubrizol Corporation |
| Dispersant 1 | As described in Example 1 of U.S. Pat. No. 7,973,186, |
| Dispersant 2 | As described in Example 2 of U.S. Pat. No. 7,973,186, |

A dispersing compound prepared as described in Example 1 of U.S. Pat. No. 7,973,186, is prepared as follows. Into a 1 liter resin kettle fitted with heating mantle, mechanical stirring, Dean-Stark trap, reflux condenser and temperature sensor were introduced 192.78 grams (g) of Unicid® 700 (a long chain, linear carboxylic acid having an average carbon chain length of 48, available from Baker Petrolite) and 60.3 g of E-100 (a mixture of tetraethylenepentamine, (TEPA), pentaethylenehexamine (PEHA), hexaethyleneheptamine (HEHA), and higher molecular weight materials with a number-average molecular weight of 250 to 300 grams per mole, available from Huntsman. Under a stream of Argon, the temperature in the kettle was raised to 100° C. and the resin was allowed to melt. When the resin was completely melted, the temperature was gradually raised to 180° C. with stirring, and the reaction was allowed to proceed for 3 hours. 3.6 milliliters of water was collected into the Dean-Stark trap. The reaction was stopped, cooled down to 140° C. and discharged to an aluminum tray to give 249 g of the amide as a beige solid.

A dispersing compound prepared as described in Example 2 of U.S. Pat. No. 7,973,186, is prepared as follows. Into a 1 liter resin kettle fitted with heating mantle, mechanical stirring, Dean-Stark trap, reflux condenser and temperature sensor were introduced 337.0 g of Unicid® 700 and 103.3 g E-100. Under a stream of Argon, the temperature in the kettle was raised to 100° C. and the resin was allowed to melt. When the resin was completely melted, the temperature was gradually raised to 180° C. with stirring, and the reaction was allowed to proceed for 3 hours. 6 milliliters of water was collected into the Dean-Stark trap. The reaction was stopped, cooled down to 140° C. and discharged into an aluminum tray to give 378 g of the amide as a beige solid.

A triamide wax prepared as described in Example II of U.S. Pat. No. 6,860,930, which is hereby incorporated by reference herein in its entirety, is prepared as follows. To a 1,000 milliliter four-neck round bottom flask fitted with a Trubore stirrer, $N_2$ inlet, Dean-Stark trap with condenser and $N_2$ outlet and thermocouple-temperature controller was added 350.62 grams (0.3675 moles) of UNICID® 550 (a mono-acid obtained from Baker-Petrolite Corp., Cincinnati, Ohio, of the formula $CH_3(CH_2)_n COOH$, wherein n has an average value of about 37 and is believed to have a range of from about 34 to about 40) and 0.79 grams of NAUGARD® 524 (antioxidant obtained from Chemtura Corporation, Middlebury, Conn.). The mixture was heated to 115° C. to melt and stirred at atmospheric pressure under $N_2$. 51.33 grams (0.1167 moles) of JEFFAMINE® T-403 (mixture of triamines obtained from Huntsman Corporation, Houston, Tex., of the formula

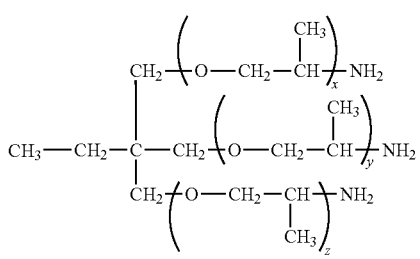

wherein x, y, and z are each integers representing the number of repeat propyleneoxy units, wherein x, y, and z may each be zero, and wherein the sum of x+y+z is from about 5 to about 6) was then added to the reaction mixture, and the reaction temperature was increased to 200° C. gradually over 0.5 hour and held at that temperature for another 3 hours. Some water was carried out by slow blowing $N_2$ and condensed into the trap when the mixture temperature reached about 180° C. The trap and condenser were then removed, and vacuum (about 25 mm Hg) was applied for about 0.5 hour and then released. The liquid product was cooled down to about 150° C. and poured onto aluminum to solidify. The resulting product was believed to be of the formula

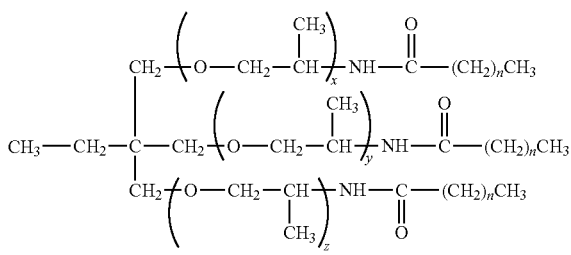

wherein n, x, y, and z are as defined hereinabove in this Example.

A urethane compound prepared as described in Example 4 of U.S. Pat. No. 6,309,453, is prepared as follows. About 80.0 grams (0.052 moles) of ARCOL LHT 112 (glycerol propoxylate available from ARCO Chemical Co.) and about 46.6 grams (0.156 moles) octadecyl isocyanate (Mondur O-Octadecyl Isocyanate available from Bayer Corporation) were placed in a 200 milliliter beaker with a magnet and heated to 115° C. with a silicone oil bath. Five drops of catalyst (Fascat® 4202, dibutyltindilaurate available from Elf Atochem North American, Inc.) were added and the mixture allowed to react for 2 hours at 115° C. An FT-IR of the reaction product showed the absence (disappearance) of a peak at ~2285 cm$^{-1}$ (NCO) and the appearance (or increase in magnitude) of peaks at ~1740-1680 cm$^{-1}$ and ~1540-1530 cm$^{-1}$ corresponding to urethane frequencies. The final urethane product was then poured into a specimen jar and allowed to cool and harden. This final product was a solid at room temperature characterized by a viscosity of about 15.8 cPs as measured by a Ferranti-Shirley cone-plate viscometer at about 135° C. and a melting point of about 23.8° C. as measured by a Differential Scanning calorimetry using a DuPont 2100 calorimeter at a scan rate of 20° C./minute.

Indigo Carmine, Alizarin Red S, Cochineal, N,N-dimethyl dioctadecyl bromide were purchased from Aldrich. Arquad® 316 was obtained from Akzo Nobel. Alizarin Red S was modified using Arquad® 316 and the yield for the modified compounds was between 49 to 89 percent by weight. The natural colorants (Woad, Lac) were purchased from "Earthues"—A Natural color company, Inc. The dispersants were Solsperse® 17000 purchased from The Lubrizol Corporation and those described in Examples 1 and 2 of U.S. Pat. No. 7,973,186. Indigo Carmine was modified using N,N-dimethyl dioctadecyl ammonium bromide and the yield for the modified compounds was about 90 percent by weight.

Example 1a

Pigmented Solid Ink Containing Madder, Alizarin Red S, and Solsperse® 17000. The following materials were weighed in a 600 milliliter beaker such that the accompanying weight percentages also include the pigment, synergist, and dispersant that were added in subsequent mixing step: 79.36 grams (49.6%) Wax A, 20.32 grams (12.7%) triamide wax, 23.2 grams (14.5%) of KEMAMIDE® S180, 23.5 grams (14.5%) KE-100 resin, 0.64 gram (4%) urethane resin, 0.32 gram (0.2%) NAUGARD® 445, and 3.2 grams (2%) Solsperse® 17000. The materials were melted in an oven at 120° C., mixed well, then transferred to a Szegvari 01 attritor (Union Process), that was also heated to 120° C., and charged with 1,800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 3.2 grams (2%) of Madder as pigment and 0.8 gram (0.5%) Alizarin Red S as synergist. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Example 1b

Pigmented Solid Ink Containing Madder, Alizarin Red S, and Solsperse® 17000. The following materials were weighed in a 600 milliliter beaker such that the accompanying weight percentages also include the pigment, synergist, and dispersant that were added in subsequent mixing step: 79.36 grams (49.6%) Wax B, 20.32 grams (12.7%) triamide wax, 23.2 grams (14.5%) of KEMAMIDE® S180, 23.5 grams (14.5%) KE-100 resin, 0.64 gram (4%) urethane resin, 0.32 gram (0.2%) NAUGARD® 445, and 3.2 grams (2%) Solsperse® 17000. The materials were melted in an oven at 120° C., mixed well, then transferred to a Szegvari 01 attritor (Union Process), that was also heated to 120° C., and charged with 1,800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 3.2 grams (2%) of Madder as pigment and 0.8 gram (0.5%) Alizarin Red S as synergist. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Example 2

Pigmented Solid Ink Containing Lac Extract and Solsperse® 17000. The following materials were weighed in a 600 milliliter beaker such that the accompanying weight percentages also include the pigment and dispersant that were added in subsequent mixing step: 80.36 grams (50.15%) Wax A, 23.1 grams (14.4%) triamide wax, 24 grams (15%) of KEMAMIDE® S180, 21.3 grams (14.4%) KE-100 resin, 4 grams (2.5%) urethane resin, 0.496 gram (0.31%) NAUGARD® 445, and 2.304 grams (1.44%) Solsperse® 17000. The materials were melted in an oven at 120° C., mixed well, then transferred to a Szegvari 01 attritor (Union Process), that was also heated to 120° C., and charged with 1,800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 2.88 grams (1.8%) of Lac Extract. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Example 3a

Pigmented Solid Ink Containing Lac Extract and Dispersant 1. The following materials were weighed in a 600 milliliter beaker such that the accompanying weight percentages also include the pigment and dispersant that were added in subsequent mixing step: 80.12 grams (50%) Wax A, 23.1 grams (14.4%) triamide wax, 24 grams (15%) of KEMAMIDE® S180, 21.3 grams (14.4%) KE-100 resin, 4 grams (2.5%) urethane resin, 0.496 gram (0.31%) NAUGARD® 445, and 2.304 grams (1.44%) Dispersant 1. The materials were melted in an oven at 120° C., mixed well, then transferred to a Szegvari 01 attritor (Union Process), that was also heated to 120° C., and charged with 1,800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 2.88 grams (1.8%) of Lac Extract. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Example 3b

Pigmented Solid Ink Containing Lac Extract and Dispersant 1. The following materials were weighed in a 600 milliliter beaker such that the accompanying weight percentages also include the pigment and dispersant that were added in subsequent mixing step: 80.12 grams (50%) wax B, 23.1 grams (14.4%) triamide wax, 24 grams (15%) of KEMAMIDE® S180, 21.3 grams (14.4%) KE-100 resin, 4 grams (2.5%) urethane resin, 0.496 gram (0.31%) NAUGARD® 445, and 2.304 grams (1.44%) Dispersant 1. The materials were melted in an oven at 120° C., mixed well, then transferred to a Szegvari 01 attritor (Union Process), that was also heated to 120° C., and charged with 1,800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 2.88 grams (1.8%) of Lac Extract. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Example 4a

Pigmented Solid Ink Containing Woad Extract, Indigo Carmine, and Dispersant 1. The following materials were weighed in a 600 milliliter beaker such that the accompanying weight percentages also include the pigment and dispersant that were added in subsequent mixing step: 79.52 grams (49.7%) polyethylene Wax A, 23.04 grams (14.4%) triamide wax, 24 grams (15%) KEMAMIDE® S180, 23.04 grams (14.4%) KE-100 resin, 4 grams (2.5%) urethane resin, 0.496 gram (0.31%) NAUGARD® 445, and 2.304 grams (1.44%) Dispersant 1. The materials were melted in an oven at 120° C., mixed well, then transferred to a Szegvari 01 attritor (Union Process), that was also heated to 120° C., and charged with 1,800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 2.88 grams (1.8%) of Woad Extract as pigment and 0.72 grams (0.45%) Indigo Carmine as synergist. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Example 4b

Pigmented Solid Ink Containing Woad Extract, Indigo Carmine, and Dispersant 1. The following materials were weighed in a 600 milliliter beaker such that the accompanying weight percentages also include the pigment and dispersant that were added in subsequent mixing step: 79.52 grams (49.7%) Wax B, 23.04 grams (14.4%) triamide wax, 24 grams (15%) of KEMAMIDE® S180, 23.04 grams (14.4%) KE-100 resin, 4 grams (2.5%) urethane, 0.496 gram (0.31%) NAUGARD® 445 and 2.304 grams (1.44%) Dispersant 1. The materials were melted in an oven at 120° C., mixed well, then transferred to a Szegvari 01 attritor (Union Process), that was also heated to 120° C., and charged with 1,800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 2.88 grams (1.8%) of Woad Extract as pigment and 0.72 grams (0.45%) Indigo Carmine as synergist. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Example 5a

Pigmented Solid Ink Containing Woad Extract, Indigo Carmine, and Solsperse® 17000. The following materials were weighed in a 600 milliliter beaker such that the accompanying weight percentages also include the pigment and dispersant that were added in subsequent mixing step: 79.52 grams (49.7%) Wax A, 23.04 grams (14.4%) triamide wax, 24 grams (15%) of KEMAMIDE® S180, 23.04 grams (14.4%) KE-100 resin, 4 grams (2.5%) urethane resin, 0.496 gram (0.31%) NAUGARD® 445, and 2.304 grams (1.44%) Solsperse® 17000. The materials were melted in an oven at 120° C., mixed well, then transferred to a Szegvari 01 attritor (Union Process), that was also heated to 120° C., and charged with 1,800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 2.88 grams (1.8%) of Woad Extract as pigment and 0.72 grams (0.45%) Indigo Carmine as synergist. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Example 5b

Pigmented Solid Ink Containing Woad Extract, Indigo Carmine, and Solsperse® 17000. The following materials were weighed in a 600 milliliter beaker such that the accompanying weight percentages also include the pigment and dispersant that were added in subsequent mixing step: 79.52 grams (49.7%) Wax B, 23.04 grams (14.4%) triamide wax, 24 grams (15%) of KEMAMIDE® S180, 23.04 grams (14.4%) KE-100 resin, 4 grams (2.5%) urethane resin, 0.496 gram (0.31%) NAUGARD® 445, and 2.304 grams (1.44%) Solsperse® 17000. The materials were melted in an oven at 120° C., mixed well, then transferred to a Szegvari 01 attritor (Union Process), that was also heated to 120° C., and charged with 1,800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 2.88 grams (1.8%) of Woad Extract as pigment and 0.72 grams (0.45%) Indigo Carmine as synergist. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Example 6a

Pigmented Solid Ink Containing Carmine, and Dispersant 2. The following materials were weighed in a 600 milliliter beaker such that the accompanying weight percentages also include the pigment and dispersant that were added in subsequent mixing step: 80.14 grams (50.09%) Wax A, 20.32 grams (12.7%) triamide wax, 23.2 grams (14.5%) of KEMAMIDE® S180, 23.5 grams (14.4%) KE-100 resin, 0.64 gram (4%) urethane resin, 0.32 gram (0.31%) NAUGARD® 445, and 3.2 grams (2%) Dispersant 2. The materials were melted in an oven at 120° C., mixed well, then transferred to a Szegvari 01 attritor (Union Process), that was also heated to 120° C., and charged with 1,800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 3.2 grams (2%) of Carmine. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Example 6b

Pigmented Solid Ink Containing Carmine, and Dispersant 2. The following materials were weighed in a 600 milliliter beaker such that the accompanying weight percentages also include the pigment and dispersant that were added in subsequent mixing step: 80.14 grams (50.09%) Wax B, 20.32 grams (12.7%) triamide wax, 23.2 grams (14.5%) of a stearyl stearamide wax (KEMAMIDE® S180, available from Crompton Corporation), 23.5 grams (14.4%) KE-100 resin, 0.64 gram (4%) urethane resin, 0.32 gram (0.31%) NAUGARD® 445, and 3.2 grams (2%) Dispersant 2. The materials were melted in an oven at 120° C., mixed well, then transferred to a Szegvari 01 attritor (Union Process), that was also heated to 120° C., and charged with 1,800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 3.2 grams (2%) of Carmine. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec MFS. Inc.

Example 7

Pigmented Solid Ink Containing Tumeric and Dispersant 1. The following materials were weighed in a 600 milliliter beaker such that the accompanying weight percentages also include the pigment, synergist and dispersant that were added in subsequent mixing step: 79.49 grams (49.68%) Wax A, 21.04 grams (13.17%) triamide wax, 22.56 grams (14.1%) KEMAMIDE® S180, 21.02 grams (13.17%) KE-100 resin, 2.68 grams (1.68%) urethane resin 0.4 grams (0.25%) NAUGARD® 445, and 4.77 grams (2.98%) of Dispersant 1. The materials were melted in an oven at 120° C., mixed well, then to this stirring solution were added 7.95 grams (4.97%) of Tumeric. The ink was allowed to stir for an hour or so, and then was filtered through 38 micron wire filter to get rid of the roots and woodsy stuff. The filtered mixture was transferred to a Szegvari 01 attritor, available from Union Process, that was also heated to 120° C., and charged with 1800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. The pigmented ink was allowed to attrite at 300 RPM for 20 hours upon which the final attrited mixture was isolated from the stainless steel balls and filtered with a 5 micron stainless steel mesh using a KST-47 filtration apparatus, commercially available from Advantec Corporation.

Example 8

An ink was prepared as in Example 7 except that 0.5% Cinnamic acid as color stabilizer was added to the pigmented ink before it was loaded into the attritor.

Example 9

An ink was prepared as in Example 7 except that 0.5% Tinuvin 622 EB (available from BASF) as a light stabilizer was added to the pigmented ink before it was loaded into the attritor.

The pigmented inks were allowed to attrite at 300 RPM for 20 hours upon which the final attrited mixture was isolated from the stainless steel balls and filtered with a 5 micron stainless steel mesh using a KST-47 filtration apparatus, commercially available from Advantec Corporation.

Ink Characterization Results.

Rheology.

A shear viscosity profile was determined at 110° C. using a 50 mm cone and plate geometry on a RFS-III rheometer, obtained from Rheometrics Corporation, now TA Instruments. The shear viscosities at 1 and 100 $s^{-1}$ were determined from the shear rate sweep extending from 1 to approximately 251.2 $s^{-1}$. An appropriate target viscosity range of the ink is approximately 8 to approximately 13 centipoise and better Newtonian behavior is realized when the difference of the viscosities at each of these comparative shear rates, such as 1 and 100 $s^{-1}$ are minimized, such as being less than about 1 centipoise, such as being less than about 0.5 centipoise or zero. The rheology studies indicate that the novel inks of the present disclosure displayed Newtonian behavior and are therefore very suitable to be used as phase change ink jet inks.

The rheology results show that the inks of the present disclosure displayed Newtonian behavior as can be seen in Table 3.

TABLE 3

| Example # | Natural Pigment | Viscosity at 1 s$^{-1}$ (centipoise) | Viscosity at 100 s$^{-1}$ (centipoise) |
|---|---|---|---|
| 2 | Lac | 11.8 | 11.5 |
| 3 | Lac | 11.9 | 12.2 |
| 4 | Woad | 12.3 | 12.2 |
| 5 | Woad | 12.4 | 12.4 |
| 6 | Cochineal | 13.0 | 12.9 |

The various inks were printed on a Xerox® Phaser® printer.

The prints were tested for lightfastness with a Suntest XLS+ available from Atlas Material Testing Solutions. The relative fading resistances of the prints were qualitatively assessed using a relatively low dose of 1 hour exposure and Black Standard Temperature (BST) of about 50° C., and transmission of about 380 to about 720 nanometers such that the total exposed energy was 2,520 KJ/m².

FIG. 1 shows 200% and 100% density, left and right side, respectively, of prints of Examples 2a, 3a, 4a, 5a, 6a, and 7 inks before lightfastness testing 200% and 100% density, left and right side, respectively, of prints of Examples 2a, 3a, 4a, 5a, 6a, and 7 inks after lightfastness testing.

As illustrated in FIG. 1, a satisfactory lightfastness was exhibited for prints prepared with the present inks containing lac extract, woad extract, and cochineals. Prints prepared with the present inks containing turmeric were also acceptable for general printing while exhibiting less suitability where lightfastness is strongly desired.

Phase change inks containing naturally-derived colorants derived from insects and plants are provided. The phase change inks exhibit Newtonian rheological behavior. In embodiments, naturally-derived colorants, in embodiments, pigments, derived from plants and insects have been successfully formulated in solid ink ad exhibited solid ink jettability in a phase change ink jet printer. In certain embodiments, Indigo Carmine is provided as a synergist to disperse naturally-derived pigments, in embodiments, Indigo Carmine is provided as a synergist to disperse woad in solid ink. In other embodiments, modified Indigo Carmine is provided as a synergist to disperse naturally-derived pigments, in embodiments, modified Indigo Carmine is provided as a synergist to disperse woad in solid ink. In certain other embodiments, phase change inks are provided including a dispersant wherein the dispersant is selected to affect the color of the phase change ink. In embodiments, phase change inks are provided containing woad extract and Indigo Carmine as synergist and these phase change inks are blue when Dispersant 1 is selected as a dispersant and violet when Solsperse® 17000 is used as a dispersant. The content of environmentally-friendly components of the phase change inks herein is increased over previously available inks. In embodiments, the content of environmentally-friendly components of the phase change inks herein is increased over previously available inks when used in combination with biodegradable wax which can represent about 75 to about 80 percent of the phase change ink composition by weight based on the total weight of the phase change ink composition. In certain embodiments, naturally-derived colorants prepared by insects and plants provide earthy and vat-like colors in the present phase change ink compositions.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change ink composition comprising:
   a wax;
   an optional dispersant;
   an optional synergist; and
   a naturally-derived colorant wherein the naturally-derived colorant is a colorant derived from a plant, a colorant derived from an insect, or a mixture or combination thereof.

2. The phase change ink composition of claim 1, wherein the naturally-derived colorant is derived from a member of the group consisting of Safflower, *Caesalpina*, Maddar, *Kermes*, Drago tree, *Daemonorops*, Cochineal, Lac, *Bougainvillea*, Golden rod, Teak, Marigold, Weld, Saffron, Parijata, Indigo, Woad, Suntberry, Pivet, molluscs, Murasaki, Water lily, Tulsi, Canna, Lily, Nettles, Balsam, *Dahlia*, Annatto, Blackberries, Alder, Rofblamala, Custard apple, Harda, Turmeric, and mixtures and combinations thereof.

3. The phase change ink composition of claim 1, wherein the naturally-derived colorant is derived from a member of the group consisting of tetrapyrroles, tetra-terpenoids, quinines, O-heterocyclic compounds, N-heterocyclic compounds, metallo-proteins, or a mixture or combination thereof.

4. The phase change ink composition of claim 1, wherein the naturally-derived colorant is derived from a member of the group consisting of porphyrins, porphyrin derivatives, chlorophylls, heme pigments, bilins, carotenes, xanthophylls, benzoquinones, anthraquinones, naphthiquinones, anthocyanins, flavonols, indigoids, indole derivatives, betalaines, eumelanins, substituted pyrimidines, pterins, purines, oligomeric proteins, iron-based proteins, haemerythrin, myohemerythrin, lipofuscins, fungal pigments, and mixtures and combinations thereof.

5. The phase change ink composition of claim 1, wherein the wax is a polyalkylene wax.

6. The phase change ink composition of claim 1, wherein the wax is a polymethylene wax, a polyethylene wax, or a mixture or combination thereof.

7. The phase change ink composition of claim 1, wherein the wax is a biodegradable wax.

8. The phase change ink composition of claim 1, wherein the dispersant a compound of the formula

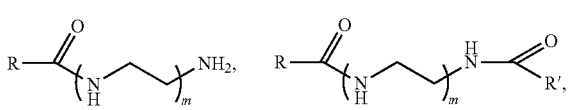

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

9. The phase change ink of claim 1, wherein the dispersant is selected to steer the color of the phase change ink.

10. The phase change ink composition of claim 1, wherein the synergist is a compound of the formula
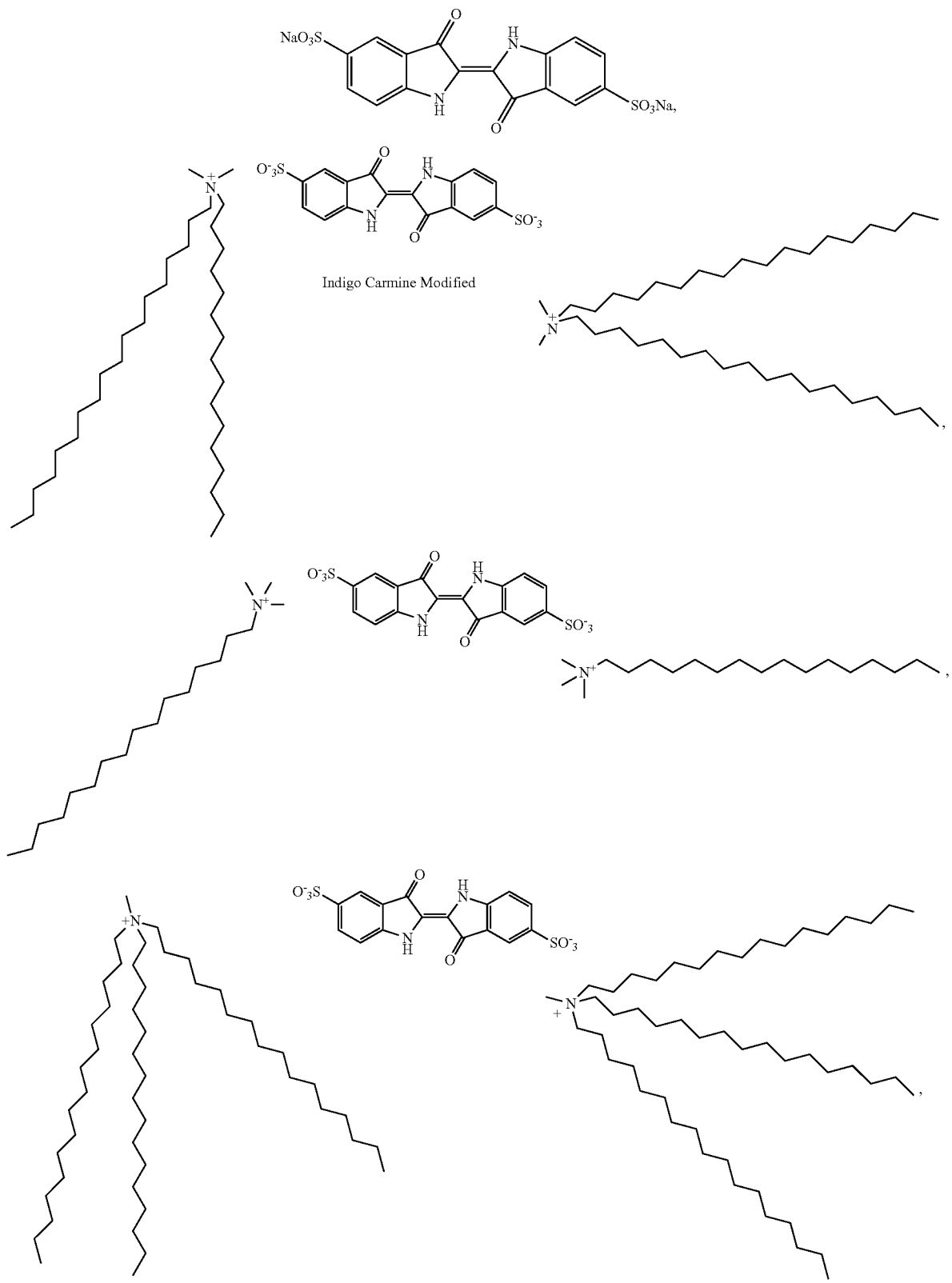
Indigo Carmine Modified

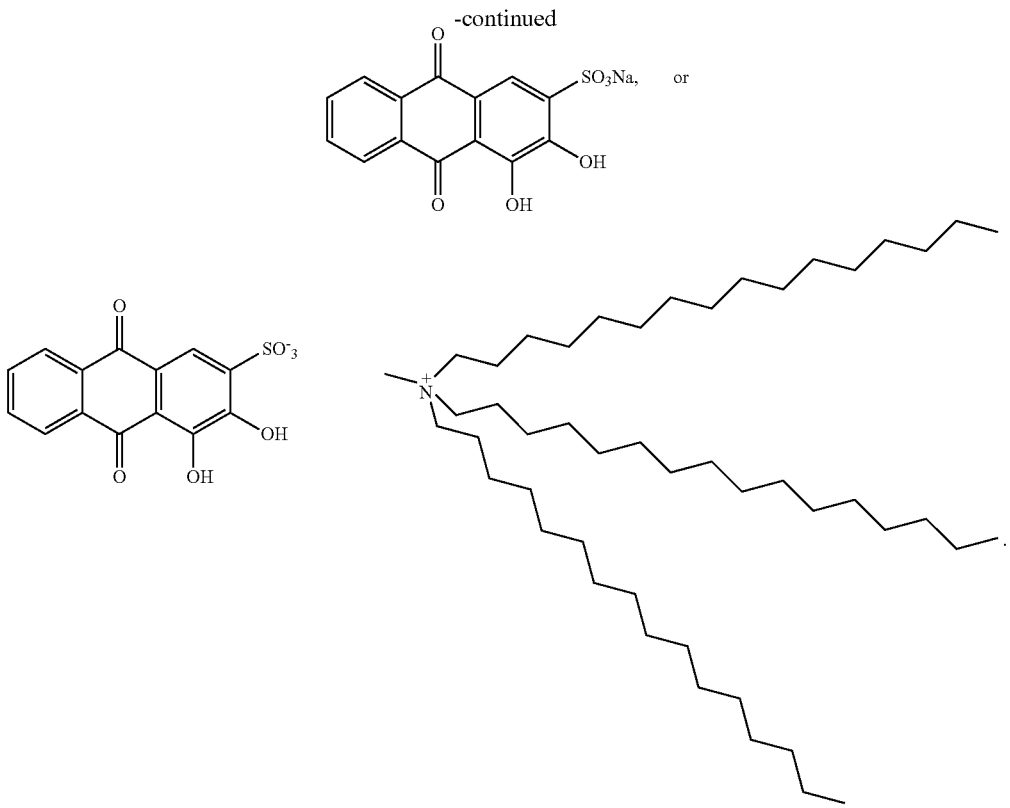

11. A method for preparing a phase change ink composition comprising:
combining a wax; an optional dispersant; an optional synergist; and a naturally-derived colorant wherein the naturally-derived colorant is a colorant derived from a plant, a colorant derived from an insect, or a mixture or combination thereof, to produce a phase change ink composition.

12. The method of claim 11, wherein the naturally-derived colorant is derived from a member of the group consisting of Safflower, *Caesalpina*, Maddar, *Kermes*, Drago tree, *Daemonorops*, Cochineal, Lac, *Bougainvillea*, Golden rod, Teak, Marigold, Weld, Saffron, Parijata, Indigo, Woad, Suntberry, Pivet, molluscs, Murasaki, Water lily, Tulsi, Canna, Lily, Nettles, Balsam, *Dahlia*, Annatto, Blackberries, Alder, Rofblamala, Custard apple, Harda, Turmeric, and mixtures and combinations thereof.

13. The method of claim 11, wherein the naturally-derived colorant is derived from a member of the group consisting of tetrapyrroles, tetra-terpenoids, quinines, O-heterocyclic compounds, N-heterocyclic compounds, metallo-proteins, or a mixture or combination thereof.

14. The method of claim 11, wherein the naturally-derived colorant is derived from a member of the group consisting of porphyrins, porphyrin derivatives, chlorophylls, heme pigments, bilins, carotenes, xanthophylls, benzoquinones, anthraquinones, naphthiquinones, anthocyanins, flavonols, indigoids, indole derivatives, betalaines, eumelanins, substituted pyrimidines, pterins, purines, oligomeric proteins, iron-based proteins, haemerythrin, myohemerythrin, lipofuscins, fungal pigments, and mixtures and combinations thereof.

15. An ink jet printer stick or pellet comprising a phase change ink composition comprising:
a wax;
an optional dispersant;
an optional synergist; and
a naturally-derived colorant wherein the naturally-derived colorant is a colorant derived from a plant, a colorant derived from an insect, or a mixture or combination thereof.

16. The ink jet printer stick or pellet of claim 15, wherein the naturally-derived colorant is derived from a member of the group consisting of Safflower, *Caesalpina*, Maddar, *Kermes*, Drago tree, *Daemonorops*, Cochineal, Lac, *Bougainvillea*, Golden rod, Teak, Marigold, Weld, Saffron, Parijata, Indigo, Woad, Suntberry, Pivet, molluscs, Murasaki, Water lily, Tulsi, Canna, Lily, Nettles, Balsam, *Dahlia*, Annatto, Blackberries, Alder, Rofblamala, Custard apple, Harda, Turmeric, and mixtures and combinations thereof.

17. The ink jet printer stick or pellet of claim 15, wherein the naturally-derived colorant is derived from a member of the group consisting of tetrapyrroles, tetra-terpenoids, quinines, O-heterocyclic compounds, N-heterocyclic compounds, metallo-proteins, or a mixture or combination thereof.

18. The ink jet printer stick or pellet of claim 15, wherein the naturally-derived colorant is derived from a member of the group consisting of porphyrins, porphyrin derivatives, chlorophylls, heme pigments, bilins, carotenes, xanthophylls, benzoquinones, anthraquinones, naphthiquinones, anthocyanins, flavonols, indigoids, indole derivatives, betalaines, eumelanins, substituted pyrimidines, pterins, purines, oligomeric proteins, iron-based proteins, haemerythrin, myohemerythrin, lipofuscins, fungal pigments, and mixtures and combinations thereof.

19. A method comprising:
incorporating into an ink jet printing apparatus a phase change ink composition comprising a wax; an optional dispersant; an optional synergist; and a naturally-derived colorant wherein the naturally-derived colorant is a colorant derived from a plant, a colorant derived from an insect, or a mixture or combination thereof, to produce a phase change ink composition;

melting the ink composition; and causing droplets of the melted ink to be ejected in an imagewise pattern onto a substrate.

20. The method of claim 19, wherein the naturally-derived colorant is derived from a member of the group consisting of Safflower, *Caesalpina*, Maddar, *Kermes*, Drago tree, *Daemonorops*, Cochineal, Lac, *Bougainvillea*, Golden rod, Teak, Marigold, Weld, Saffron, Parijata, Indigo, Woad, Suntberry, Pivet, molluscs, Murasaki, Water lily, Tulsi, Canna, Lily, Nettles, Balsam, *Dahlia*, Annatto, Blackberries, Alder, Rofblamala, Custard apple, Harda, Turmeric, and mixtures and combinations thereof.

* * * * *